(12) United States Patent
Yamanaka

(10) Patent No.: US 8,356,163 B2
(45) Date of Patent: Jan. 15, 2013

(54) SIMD MICROPROCESSOR AND METHOD FOR CONTROLLING VARIABLE SIZED IMAGE DATA PROCESSING

(75) Inventor: Toshiki Yamanaka, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 772 days.

(21) Appl. No.: 12/144,829

(22) Filed: Jun. 24, 2008

(65) Prior Publication Data

US 2009/0013150 A1 Jan. 8, 2009

(30) Foreign Application Priority Data

Jul. 4, 2007 (JP) ................................ 2007-175870

(51) Int. Cl.
*G06F 7/38* (2006.01)
(52) U.S. Cl. ....................................................... 712/220
(58) Field of Classification Search .................. None
See application file for complete search history.

(56) References Cited

U.S. PATENT DOCUMENTS

2006/0236075 A1* 10/2006 Hara ................................ 712/22

FOREIGN PATENT DOCUMENTS

JP 2006-260479 9/2006

* cited by examiner

*Primary Examiner* — Eddie P Chan
*Assistant Examiner* — John Lindlof
(74) *Attorney, Agent, or Firm* — Dickstein Shapiro LLP

(57) ABSTRACT

A disclosed SIMD microprocessor includes plural processor elements each having n arithmetic circuits and n registers configured to temporarily store data pieces to be input to the arithmetic circuits, n being a natural number equal to or greater than 2, and; a control circuit configured to determine an arrangement order of the processor elements and an arrangement order of the arithmetic circuits in the processor elements and determine whether to use the n arithmetic circuits as a single arithmetic circuit or as n arithmetic circuits. Each processor element further includes n shifter pairs each including a PE shifter and a bit shifter; and n shift data selection circuits configured to select arbitrary data pieces from the data pieces in the shifter pairs, perform bit extension on the data pieces, and transfer the data pieces to the arithmetic circuits.

13 Claims, 8 Drawing Sheets

FIG.5

| BIT-Shift | 0,8,16,24 | 1,9,17,25 | 2,10,18,26 | 3,11,19,27 | 4,12,20,28 | 5,13,21,29 | 6,14,22,30 | 7,15,23,31 |
|---|---|---|---|---|---|---|---|---|
| BSH(H) | 0 | 1 | 2 | 3 | 4 | 5 | 6 | 7 |
| BSH(L) | 0 | 1 | 2 | 3 | 4 | 5 | 6 | 7 |

FIG.6

| PE-Shift | -3 | -2.5 | -2 | -1.5 | -1 | -0.5 | 0 | 0.5 | 1 | 1.5 | 2 | 2.5 | 3 |
|---|---|---|---|---|---|---|---|---|---|---|---|---|---|
| PSH(H) | -3 | -2 | -2 | -1 | -1 | 0 | 0 | 1 | 1 | 2 | 2 | 3 | 3 |
| PSH(L) | -3 | -3 | -2 | -2 | -1 | -1 | 0 | 0 | 1 | 1 | 2 | 2 | 3 |

SIMD MICROPROCESSOR AND METHOD FOR CONTROLLING VARIABLE SIZED IMAGE DATA PROCESSING

BACKGROUND OF THE INVENTION

1. Field of the Invention

The present invention relates to a SIMD (Single Instruction stream Multiple Data stream) microprocessor configured to process plural image data pieces in parallel using a single operation instruction, and a data transfer method for use in the SIMD microprocessor.

2. Description of the Related Art

Image data handled by digital copiers and the like are generally a collection of data pieces arranged in two dimensions. The individual data pieces constituting an image are called pixels.

Each pixel has an assigned value, which determines the content of the image. When pixels with value "1" representing black and pixels with value "2" representing white are used, for representing an image, the image is represent in only two colors, namely, black and white. For representing intermediate colors, a pixel of 4-bit data may be used for example, which can represent 16 colors corresponding to values from 0000b to 1111b (the "b" indicating binary notation). Thus, 14 intermediate colors can be represented between black and white. If a pixel of 8-bit data is used, 256 colors can be represented.

The size of pixel data varies depending on the intended use or the content of the image. For instance, pixels of a large number of bits are used for images requiring a fine expression such as photographs, while pixels of a small number of bits are used for images requiring small data size such as images used in communications.

SIMD microprocessors are often employed for processing image data. The SIMD processors are suitable for image processing because they can perform the same arithmetic operations on plural data pieces at the same time with a single instruction. A typical SIMD microprocessor includes plural processor elements (hereinafter referred to as "PEs") each having an arithmetic circuit and a register. The SIMD microprocessor causes, with a single instruction, these PEs to perform the same arithmetic operations on plural data pieces at the same time. Each PE is generally designed to process a single pixel of an image when processing the image.

In recent years, there have been demands on image processing for increasing the processing speed and improving the image quality. The image processing speed of SIMD processors may be increased by either one of two approaches. One is to increase the operating frequency of the processor, and the other is to increase the number of pixels processed at the same time.

Increasing the operating frequency has been a constant demand, and it is not easy to achieve a further significant improvement in the operating frequency. Increasing the number of pixels processed at the same time may be generally achieved by increasing the number of PEs. Increasing the number of PEs, however, results in greater circuit size and lower operating frequency.

Meanwhile, improving the image quality means increasing the number of colors or gray levels of pixels, resulting in increasing the size of pixel data. For example, the size of pixel data is increased from 8 bit for 256 gray levels to 16 bits for 65536 gray levels. If the size of pixel data is increased, the operation data size in each PE needs to be increased.

As can be seen, a variety of demands are imposed on SIMD processors, such as improving the operating frequency, increasing the number of PEs, and increasing the operation data size in each PE.

Japanese Patent Laid-Open Publication No. 2006-260479 discloses a SIMD microprocessor that realizes an increase of the number of PEs and an increase of the operation data size. The SIMD microprocessor of Patent Document 1 is of a layered type in which each PE includes plural arithmetic circuits. This SIMD microprocessor can operate in a mode for processing reduced size pixels using an increased number of PEs or a mode for processing increased size pixels using a reduced number of PEs.

FIG. 8 illustrates an exemplary configuration of related-art PEs 110. Each PE 110 includes a register (REG) 111, a PE shifter (PSH) 112, a bit shifter (BSH) 113, an ALU (L) 114a, and an ALU (H) 114b.

The register 111 temporarily stores data to be operated on in the PE 110. In the example of FIG. 8, in order to process 8-bit pixels and 16-bit pixel, a 16-bit register as the register 111, which can be split into two 8-bit registers, is provided one for each PE 110.

The PE shifter 112 selects data pieces from the register 111 in the current PE 110 and the register 111 in the adjacent PE 110 and transfers the selected data pieces to the bit shifter 113. That is, data pieces are shifted among the PEs 110. The PE shifter 112 of FIG. 8 includes 7-to-1 multiplexers 112a in order to refer to data in previous three and subsequent three continuous pixels. In the case of 16-bit data, data pieces in a PE 110 are shifted (transferred) as they are. In the case of 8-bit data, either one of the following two transfer methods is used. One is for the case where the priority in data arrangement is given to the arrangement order of the PEs 110. This method transfers data pieces in the same manner as in the case of 16-bit data. The other is for the case where the priority is given to the arrangement order in the PEs 110. This method requires data transfer in each PE 110. Therefore, 2-to-1 multiplexers 112b are provided at the subsequent stage of the 7-to-1 multiplexers 112a in the PE shifter 112.

The bit shifter 113 performs bit shift and bit extension of data. Because an ALU requires double-precision arithmetic capacity with respect to the values in the register 111, 16 bit data are extended to 32-bit and 8-bit data are extended to 16-bit. After converting data into double precision data by using a 16-to-1 multiplexer 113a for 16-bit data and an 8-to-1 multiplexer 113b for 8-bit data, either one is selected. Then, lower-order 16 bits are transferred to a lower ALU (L) 114a, while higher-order 16 bits are transferred to a higher ALU (H) 114b.

The ALU (L) 114a and the ALU (H) 114b are Arithmetic and Logic Units (ALUs) each configured to perform 16-bit arithmetic operations. Although the ALU (L) 114a and the ALU (H) 114b can perform arithmetic operations independently from each other, the ALU (L) 114a and the ALU (H) 114b can be linked to operate as a 32-bit ALU 114.

In the PE 110 having the above-described configuration, data read from the register 111 are transferred to the ALU (L) 114a and the ALU (H) 114b via the PE shifter 112 and the bit shifter 113.

A global processor 120 is a controller for controlling operations of the PEs 110 and is an independent processor for executing reading of programs. The global processor 120 includes various registers and a memory for storing data.

FIG. 9 illustrates another exemplary configuration, wherein each PE shifter 112 includes 11-to-1 multiplexers 112c. In this configuration, the number of inputs that can be selected is increased in order to select data of the previous and next three pixels in both cases where the priority in data arrangement is given to the arrangement order of the PEs and where the priority is given to the arrangement order in the PEs 110. It is difficult to generally determine which configuration is better in terms of circuit size and the operating speed, the configuration of FIG. 8 for performing shifts using two steps or the configuration of FIG. 9 for selecting many inputs and performing shifts all at once.

As described above, methods for manipulating the pixel size (the number of bits) and the number of PEs by enabling splitting in a SIMD microprocessor have been disclosed. However, a selector switch for realizing such an operation is added, resulting in increased circuit size and reduced operating speed.

SUMMARY OF THE INVENTION

The present invention is directed to provide a SIMD microprocessor that provides both improved image processing performance and improved image quality without increasing the circuit size and without reducing the operating speed.

According to an aspect of the present invention, there is provided a SIMD microprocessor that comprises plural processor elements each having n arithmetic circuits and n registers configured to temporarily store data pieces to be input to the arithmetic circuits, n being a natural number equal to or greater than 2, and; a control circuit configured to determine an arrangement order of the processor elements and an arrangement order of the arithmetic circuits in the processor elements and determine whether to use the n arithmetic circuits as a single arithmetic circuit or as n arithmetic circuits. Each of the processor elements further includes n shifter pairs each including a PE shifter and a bit shifter, the PE shifter being configured to select and transfer plural pieces of data that are input from the different processor elements, the bit shifter being configured to perform a bit shift operation on the data pieces temporarily stored in the registers; and n shift data selection circuits configured to select arbitrary data pieces from the data pieces in the shifter pairs, perform bit extension on the data pieces, and transfer the data pieces to the arithmetic circuits. This SIMD microprocessor includes, in each processor element, the n shifter pairs each including a PE shifter and a bit shifter; and the n shift data selection circuits configured to select arbitrary data pieces from the output of the shifter pairs, perform bit extension on the data pieces, and transfer the data pieces to the n arithmetic circuits. Therefore, the n arithmetic circuits can be used as n arithmetic circuits or as a single arithmetic circuit. Also, it is possible to reduce the circuit size and increase the operating speed.

In another aspect, in the above-described SIMD microprocessor, the control circuit has a first mode that controls the n arithmetic circuits as a single arithmetic circuit; a second mode that controls, when treating the n arithmetic circuits as n arithmetic circuits, an order of the arithmetic circuits to follow the arrangement order of the arithmetic circuits in the processor elements based on the arrangement order of the processor elements; a third mode that controls, when treating the n arithmetic circuits as n arithmetic circuits, the order of the arithmetic circuits to follow the arrangement order of the processor elements based on the arrangement order of the arithmetic circuits in the processor elements; and a fourth mode that treats the n arithmetic circuits as n arithmetic circuits and operates the n arithmetic circuits separately. According to this SIMD microprocessor, the control circuit has four modes. By switching between the four modes, it is possible to appropriately transfer data pieces to be processed to the n arithmetic circuits according to input data and content of operation.

In another aspect, in the above-described SIMD microprocessor, the shift data selection circuits are made integral with the arithmetic circuits. According to this SIMD microprocessor, since the shift data selection circuits are integral with the arithmetic circuits, it is possible to reduce the number of bus interconnects for input to the arithmetic circuits, which allows reducing the area of the processor elements.

In another aspect, in the above-described SIMD microprocessor, the control circuit is configured to, in the first mode, i) cause the n PE shifters to perform transfers from the same transfer position; ii) cause the n bit shifters to perform bit shift operations using the same shift amount; and iii) cause the n shift data selection circuits to shift individual bits of output data of the n shifter pairs according to the bit shift amount in the bit shifters and select the data. According to this SIMD microprocessor, the PE shifters, the bit shifters and the shift data selection circuits are operated such that the n arithmetic circuits operate as a single arithmetic circuit. Therefore, it is possible to process images with pixels having increased amount of data, for example. That is, it is possible to process high quality images.

In another aspect, in the above-described SIMD microprocessor, the control circuit is configured to, in the second mode, i) cause the n PE shifters to perform transfers from the same transfer position; ii) cause the n bit shifters to perform bit shift operations using the same shift amount; and iii) cause the n shift data selection circuits to select data from the corresponding bit shifters. According to this SIMD microprocessor, data pieces to be processed in the n arithmetic circuits of each of the processor elements can be treated as one continuous pixel by coupling processor elements.

In another aspect, in the above-described SIMD microprocessor, the control circuit is configured to, in the third mode, i) cause the n PE shifters to perform transfers from independent transfer positions; ii) cause the n bit shifters to perform bit shift operations using the same shift amount; and iii) cause the n shift data selection circuits to shift individual bits of output data of the n shifter pairs according to the transfer positions in the individual PE shifters and select the data. According to this SIMD microprocessor, even if data pieces to be processed by the n arithmetic circuits of each of the plural processor elements are adjacent to each other in a series of data pieces and the adjacent data pieces are in the same PE or in the adjacent PEs, the data pieces can be appropriately transferred to the arithmetic circuits.

In another aspect, in the above-described SIMD microprocessor, the control circuit is configured to, in the fourth mode, control each of the n PE shifters, the n bit shifters, and the n shift data selection circuits separately. According to this SIMD microprocessor, the PE shifters and the bit shifters and the shift data selection circuits are operated such that the n arithmetic circuits operate as separate arithmetic circuits. Therefore, data pieces can be processed as two different types of continuous pixels in the arithmetic circuits independently operated in each processor element.

In another aspect, there is provided a data transfer method for use in a SIMD microprocessor that includes plural processor elements each having n arithmetic circuits, n being a natural number equal to or greater than 2, and is configured to divide input data into n data pieces depending on whether to use the n arithmetic circuits as a single arithmetic circuit or as n arithmetic circuits and transfer the input data to the arithmetic circuits. The method comprises a step of, for the individual n data pieces of the input data, selecting and transferring plural pieces of data that are input from the different processor elements and performing bit shift operations; and a step of selecting arbitrary data pieces from the data pieces on which the data selection and transfer and the bit shift operations are performed, performing bit extension on the selected data pieces, and transferring the data pieces to the arithmetic circuits. According to this transfer method, selection and transfer of plural pieces of data that are input from the different processor elements and bit shift operations are performed for the individual n data pieces of the input data. Then, arbitrary data pieces are selected from the data pieces on which the data selection and transfer and the bit shift operations are performed; bit extension are performed on the selected data pieces; and the data pieces are transferred. Therefore, arithmetic operations can be performed in the same manner as in a related-art method. Furthermore, it is possible to increase the data processing amount in the processing elements in both cases where the n arithmetic circuits are used as n arithmetic circuits and where they are used as a single arithmetic circuit.

In another aspect, the above-described data transfer method for use in a SIMD microprocessor further comprises a step of, according to the input data, selecting one of a first mode that performs transfer such that the n arithmetic circuits are treated as a single arithmetic circuit; a second mode that performs transfer, when treating the n arithmetic circuits as n arithmetic circuits, such that an order of the arithmetic circuits follows the arrangement order of the arithmetic circuits in the processor elements based on an arrangement order of the processor elements; a third mode that performs transfer, when treating the n arithmetic circuits as n arithmetic circuits, such that the order of the arithmetic circuits follows the arrangement order of the processor elements based on the arrangement order of the arithmetic circuits in the processor elements; and a fourth mode that treats the n arithmetic circuits as n arithmetic circuits and operates the n arithmetic circuits separately. According to this transfer method, since the transfer can be performed switching between the four modes, it is possible to appropriately transfer data pieces to be processed to the n arithmetic circuits according to input data and content of operation.

In another aspect, in the above-described data transfer method for use in a SIMD microprocessor, in the first mode, for each of the n input data pieces, data selection and transfers from the same transfer position are performed; bit shift operations using the same shift amount are performed; and individual bits of output data on which the data selection and transfer and the bit shift operations are performed are shifted according to the bit shift amount and the data are selected. According to this transfer method, the data selection and transfer, the bit shift operations, and data transfer to the arithmetic circuits are performed such that the n arithmetic circuits operate as a single arithmetic circuit. Therefore, it is possible to process images with pixels having increased amount of data, for example. That is, it is possible to process high quality images.

In another aspect, in the above-described data transfer method for use in a SIMD microprocessor, in the second mode, for each of the n input data pieces, data selection and transfer from the same transfer position are performed; bit shift operations using the same shift amount are performed; and the output data on which the data selection and transfer and the bit shift operations are performed are selected according to the arithmetic circuits. According to this transfer method, data pieces to be processed in the n arithmetic circuits of each of the processor elements can be treated as one continuous pixel by coupling processor elements.

In another aspect, in the above-described data transfer method for use in a SIMD microprocessor, in the third mode, for each of the n input data pieces, data selection and transfer from independent transfer positions are performed; bit shift operations using the same shift amount are performed; and individual bits of output data on which the data selection and transfer and the bit shift operations are performed are shifted according to the independent transfer positions and the data are selected. According to this transfer method, even if data pieces to be processed by the n arithmetic circuits of each of the plural processor elements are adjacent to each other in a series of data pieces and the adjacent data pieces are in the same PE or in the adjacent PEs, the data pieces can be appropriately transferred to the arithmetic circuits.

In another aspect, in the above-described data transfer method for use in a SIMD microprocessor, in the fourth mode, for each of the n input data pieces, data selection and transfer are performed from independent transfer positions; bit shift operations using independent shift amounts are performed; and the output data on which the data selection and transfer and the bit shift operations are performed are selected according to the arithmetic circuits. According to this transfer method, the data selection and transfer, the bit shift operations, and data transfer to the arithmetic circuits are performed such that the n arithmetic circuits operate as separate arithmetic circuits. Therefore, data pieces can be processed as two different types of continuous pixels in the arithmetic circuits independently operated in each processor element.

BRIEF DESCRIPTION OF THE DRAWINGS

FIG. 5 is a table showing the bit shift amounts in a bit shifter for input to an ALU;

FIG. 6 is a table showing the correspondence between the shift transfer positions supplied to each PE shifter and the actual shift transfer amounts of each PE shifter;

DETAILED DESCRIPTION OF THE PREFERRED EMBODIMENT

Figure 1:
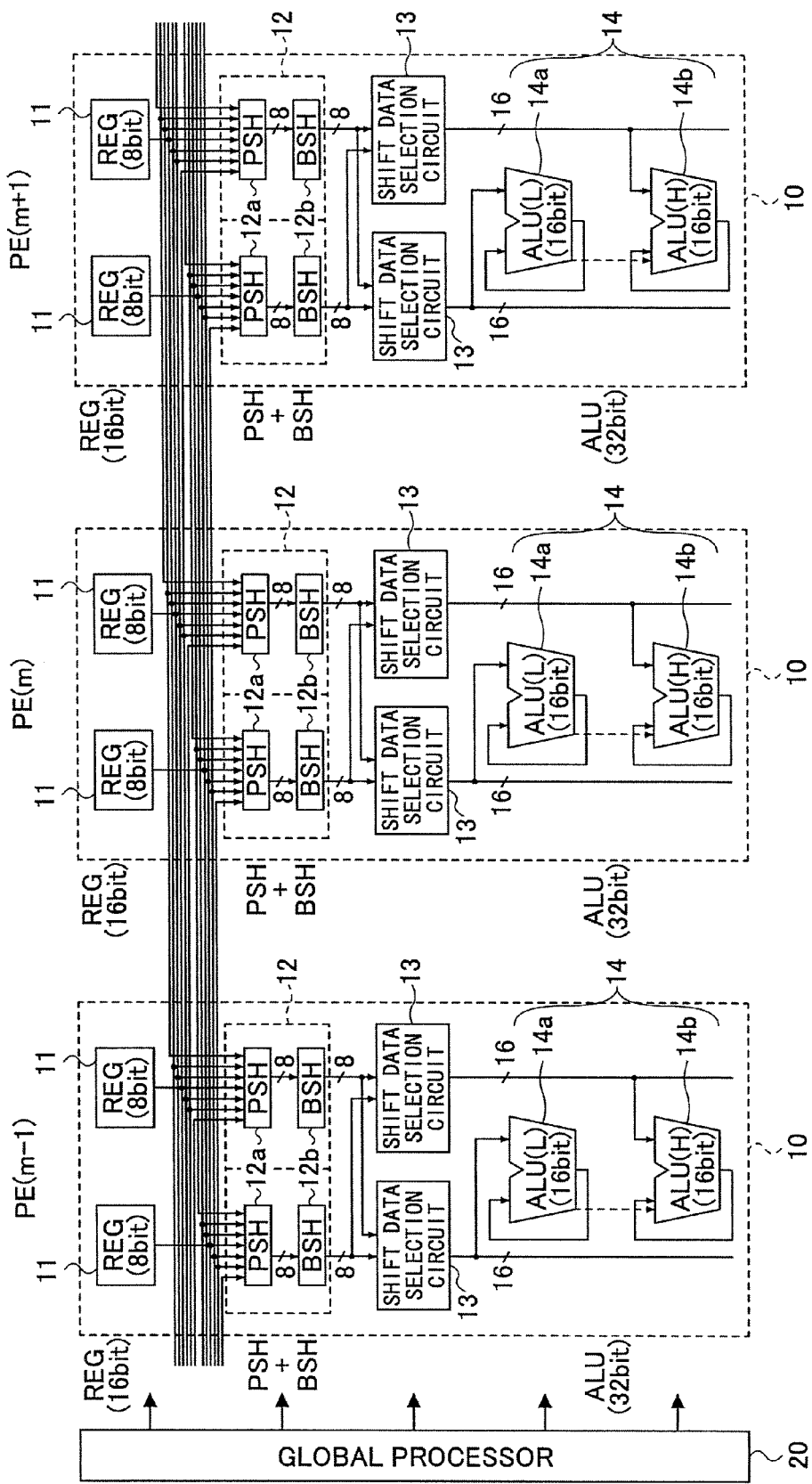
FIG. 1 is a block diagram illustrating a SIMD microprocessor according to an embodiment of the present invention.
Figure 2:
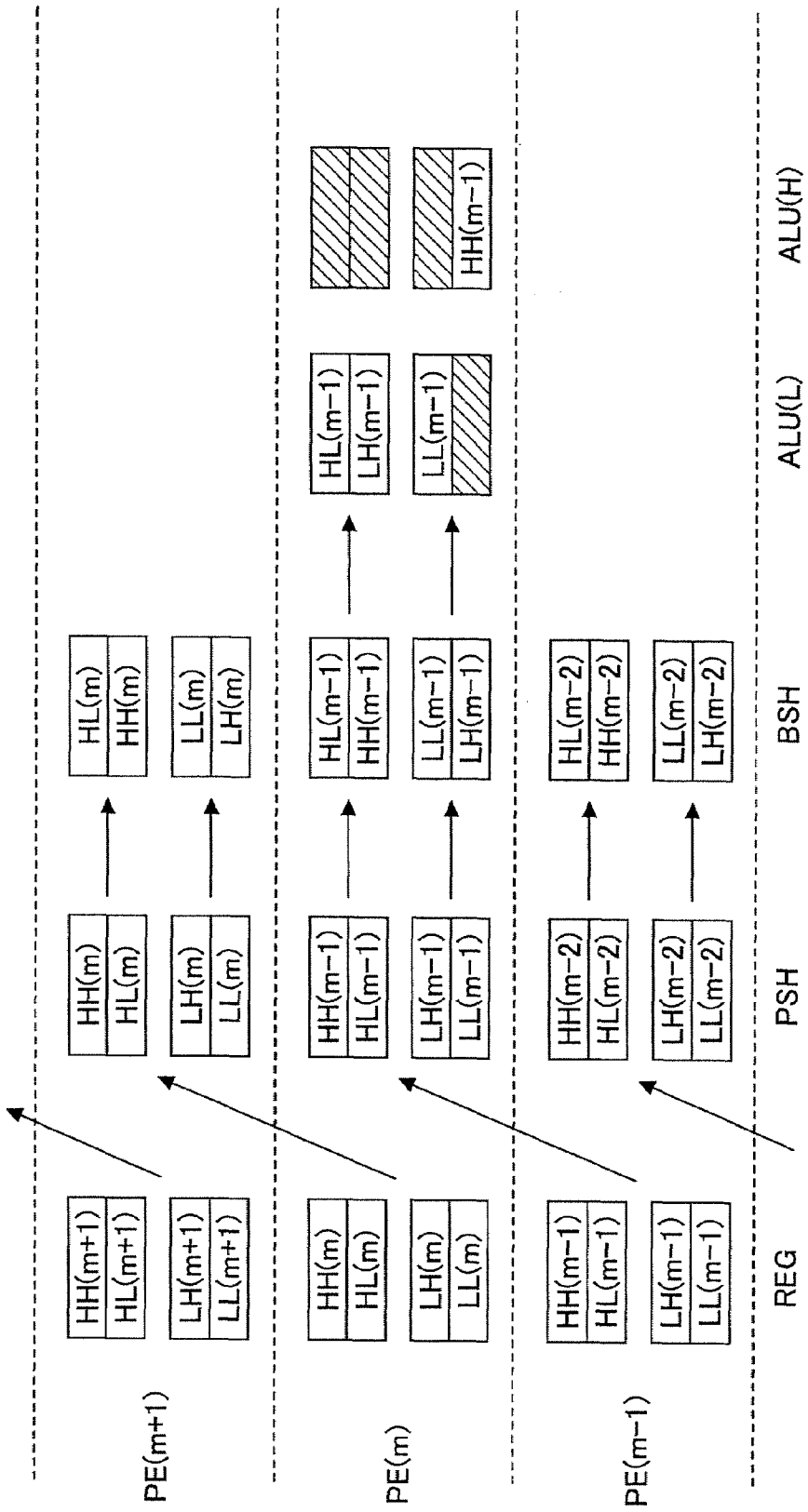
FIG. 2 is a diagram for explaining data transfer in PEs in the case where PE splitting is not performed.
Figure 3:
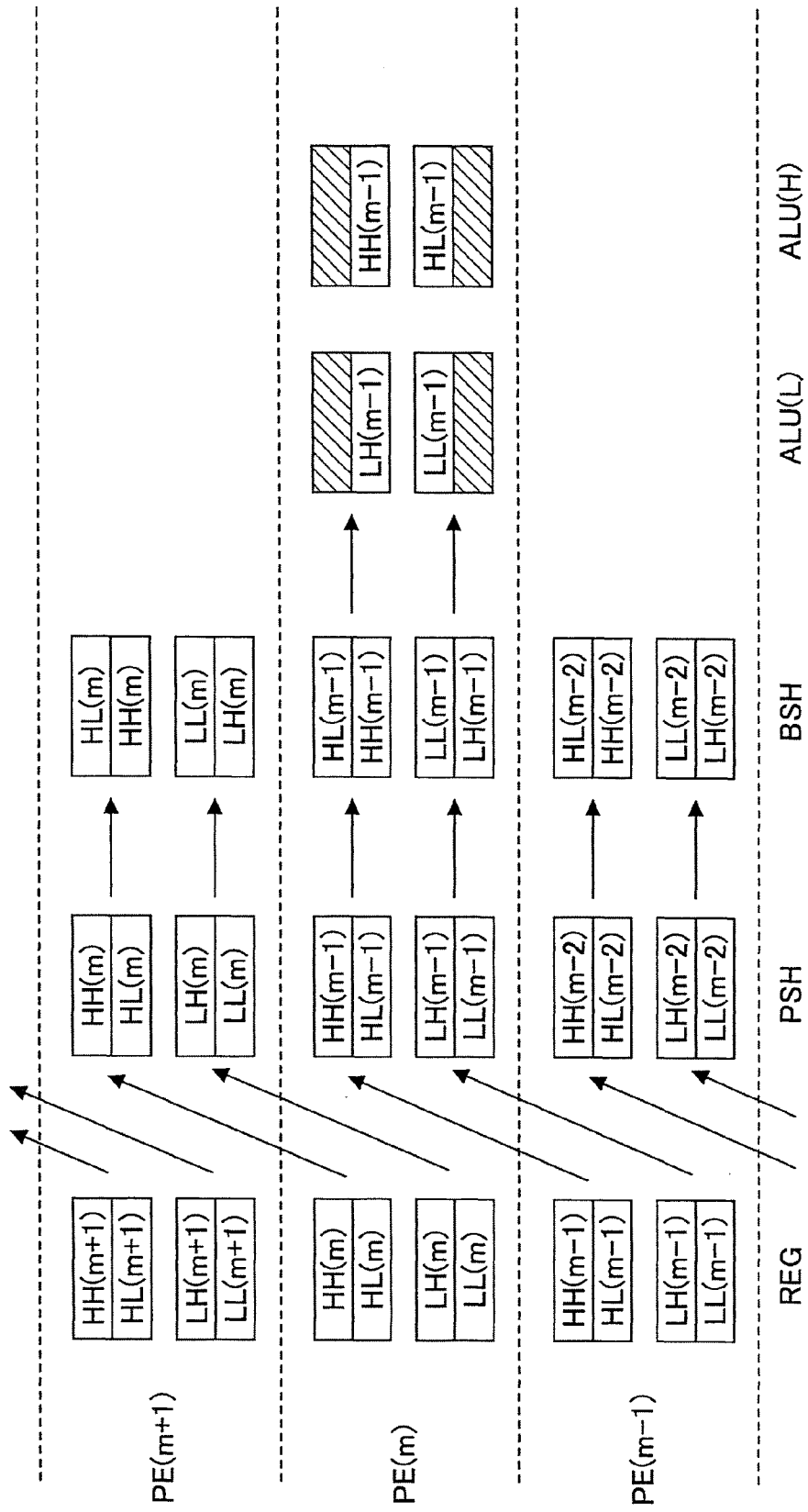
FIG. 3 is a diagram for explaining data transfer in the case where PE splitting is performed and data transfer positions among PEs are the same as the data transfer positions in normal PEs.
Figure 4:
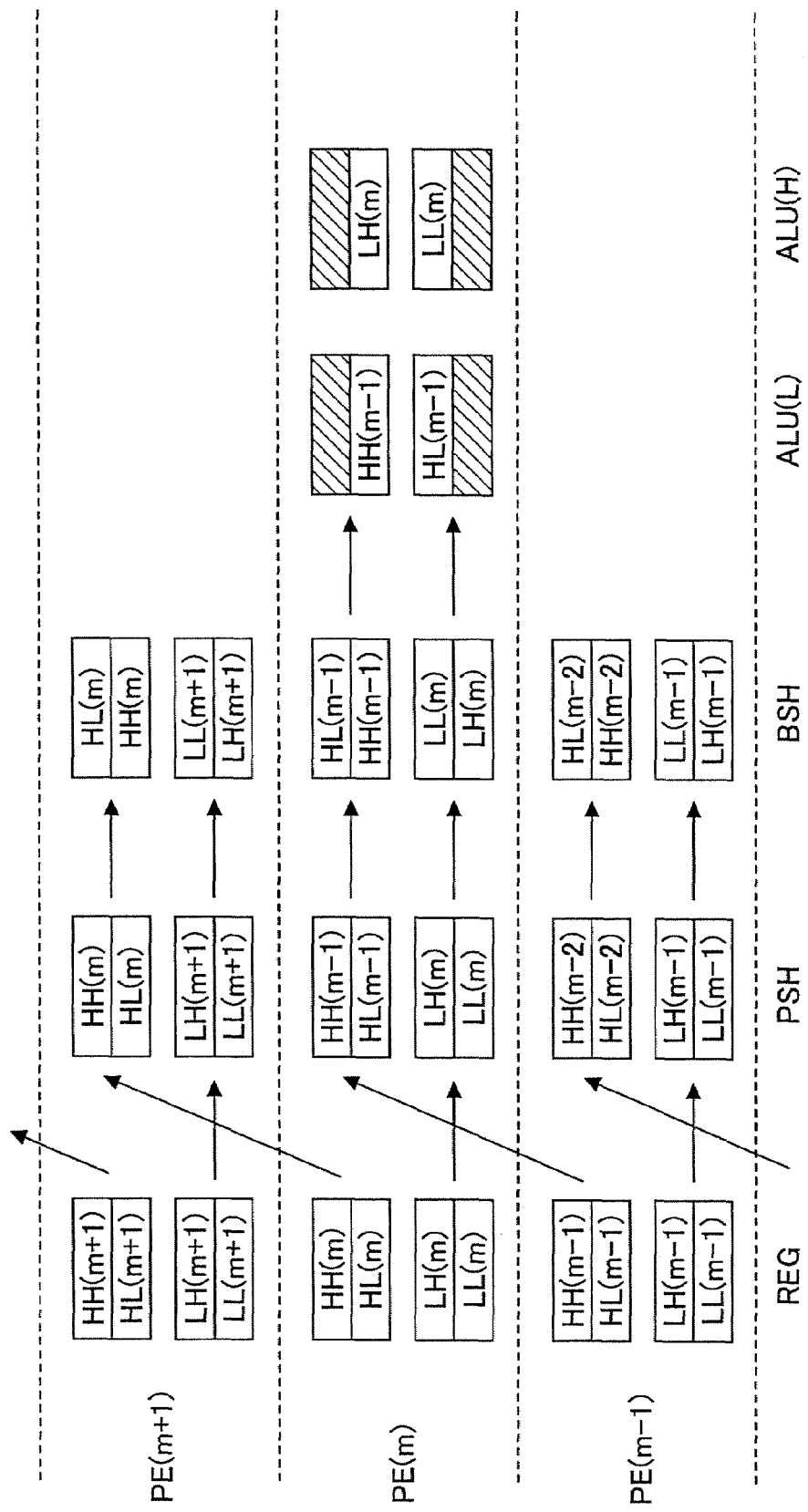
FIG. 4 is a diagram for explaining data transfer in the case where PE splitting is performed and data transfer positions among PEs are different from the data transfer positions in normal PEs.

An embodiment of the present invention is described below with reference to FIGS. 1-6. FIG. 1 is a block diagram illustrating a SIMD microprocessor according to an embodiment of the present invention. FIG. 2 is a diagram for explaining data transfer in PEs in the case where PE splitting is not performed. FIG. 3 is a diagram for explaining data transfer in the case where PE splitting is performed and data transfer positions among PEs are the same as the data transfer positions in normal PEs. FIG. 4 is a diagram for explaining data transfer in the case where PE splitting is performed and data transfer positions among PEs are different from the data transfer positions in normal PEs. FIG. 5 is a table showing the bit shift amounts in a bit shifter for input to an ALU. FIG. 6 is a table showing the correspondence between the actual shift transfer amount and the shift transfer positions supplied to each PE shifter.

The SIMD microprocessor of FIG. 1 includes plural processor elements (PEs) 10 and a global processor 20. FIG. 1 shows three of the PEs 10, namely, the PE (m) and its adjacent PE (m−1) and PE (m+1). The value in parenthesis indicates the arrangement order of the PE 10. That is, continuous data pieces input to the PEs 10 are arranged in the below-described registers 11 in the PE (m−1), the PE (m), and the PE (m+1) in this order. The PE (m−1) is located lower than the PE (m), while the PE (m+1) is located higher than the PE (m).

Each PE 10 includes two registers (REG) 11, two shifter pairs 12, two shift data selection circuits 13, an ALU (L) 114a, and an ALU (H) 114b. The PE 10 can operate two registers 11 as a single register and the ALU (L) 14a and the ALU (H) 14b as a single ALU 14 and can also operate them separately (as two registers and two ALUs). That is, this embodiment illustrates an example in which n in the appended claims is 2.

The two registers 11 are 8-bit registers. Each register 11 may be a single word register or may be a register with a multiple word configuration.

The two shifter pairs 12 correspond to the two registers 11. Each shifter pair 12 includes a PSH 12a as a PE shifter and a BSH 12b as a bit shifter. The PSH 12a is a 7-to-1 multiplexer that selects data pieces from the current PE 10 and its previous three and subsequent three PEs 10 under the control of the global processor 20 and transfers the selected data pieces to the corresponding BSH 12b. For example, if the current PE 10 is PE (m), then data pieces are selected from the PE (m−3), the PE (m−2), the PE (m−1), the PE (m+1), the PE (m+2), and the PE (m+3). The BSH 12b is an 8-to-1 multiplexer that operates as a bit shifter. The BSH 12b performs a bit shift operation based on the bit shift amount supplied from the global processor 20 and outputs the operation result.

Each shift data selection circuit 13 extends the number of bits from 8 bits to 16 bits under the control of the global processor 20, selects one of outputs of the two shifter pairs 12, the higher MSB, the lower MSB, and 0 for each bit, and outputs the result to the ALU (L) 14a or the ALU (H) 14b.

The ALU (L) 14a and the ALU (H) 14b as arithmetic circuits are Arithmetic and Logic Units (ALUs). Each of the ALU (L) 14a and the ALU (H) 14b performs 16-bit arithmetic operations. The ALU (L) 14a and the ALU (H) 14b can also be operated together as a single 32-bit ALU 14 under the control of the global processor 20. In this case, information about a carry and the like is transmitted from the lower ALU (L) 14a to the higher ALU (H) 14b via a communication interconnect (indicated by a dotted line in FIG. 1). If the ALU (L) 14a and the ALU (H) 14b are operated as a single 32-bit ALU 14, the ALU (L) 14b is for the lower-order 16 bits of 32 bits while the ALU (H) is for the higher-order 16 bits of the 32 bits.

The global processor 20 is a controller for controlling operations of the PEs 10 and is an independent processor for executing reading of programs. The global processor 20 includes various registers and a memory for storing data.

Each PE 10 of the SIMD microprocessor having the above-described configuration can operate in one of the following four modes. In the first mode, PE splitting is not performed (i.e., in the first mode, n arithmetic circuits are treated as a single arithmetic circuit). In the second mode, the arrangement order of the ALU (L) 14a and the ALU (H) 14b is based on the arrangement order of the PEs 10 in the case where PE splitting is performed (i.e., a second mode that controls, when treating the n arithmetic circuits as n arithmetic circuits, an order of the n arithmetic circuits to follow an arrangement order of the plural processor elements). In the third mode, the arrangement order of the ALU (L) 14a and the ALU (H) 14b in the PE 10 is used as a basis (i.e., a third mode that controls, when treating the n arithmetic circuits as n arithmetic circuits, the order of the n arithmetic circuits to follow an arrangement order of the n arithmetic circuits in each of the plural processor elements). In the fourth mode, the ALU (L) 14a and ALU (H) 14b are separately operated in the case where PE splitting is performed (i.e., in the fourth mode, the n arithmetic circuit in each plural processor element are operated separately). The following describes operations of the PE 10 in each mode.

First, the first mode is described with reference to FIG. 2, in which splitting of the PEs 10 is not performed. In FIG. 2, LL represents data of lower-order bits of lower-order 8 bits of 16-bit data; LH represents data of higher-order bits of the lower-order 8 bits of the 16-bit data; HL represents data of lower-order bits of higher-order 8 bits of the 16-bit data; and HH represents data of higher-order bits of the higher-order 8 bits of the 16-bit data.

The two registers 11 are used as a 16-bit register to read higher-order 8 bits and lower-order 8 bits as 16-bit data at the same time.

The higher-order 8 bits data and the lower-order 8 bits data read by the registers 11 are transferred to and selected by the PSHs 12a of the higher and lower shifter pairs 12 of the destination PE 10. Since the PSH 12a is designed to refer to data pieces of a pixel and its previous three and subsequent three continuous pixels, the PSH 12a selects from a total of 7 PEs. The PSHs 12a are provided one for higher and the other for lower in view of PE splitting. However, in the case of treating 16-bit data without performing PE splitting, the upper and the lower PSHs 12a select data from a common transfer position. In the example of FIG. 2, data pieces in the registers 11 in the PE 10 one order lower are selected and transferred by the PSHs 12a. In this case, since the higher-order 8 bits and the low order 8 bits are transferred from the same transfer position (the higher-order 8 bits and the low order 8 bits are selected and transferred from the PE 10 one order lower), the 16-bit data in the registers 11 are transferred to the destination PE 10 as they are. The transfer position indicates the relative position selected by the PSH 12a compared to the position of the current PE 10 (the PE one order below in the example of FIG. 2).

Then the BSHs 12b perform bit shift operations on the data pieces transferred by the PSHs 12a. In the case of treating 16-bit data, a 16-bit shift operation is usually performed. In this embodiment, however, the 8-bit BSHs 12b are provided one for lower order and the other for higher order, and the bit shift operation is performed in each of the BSHs. The bit shift amounts used in this step are all the same. As shown in FIG. 2, the arrangement order of output data pieces of the BSHs 12b is different from the data arrangement order of the data pieces obtained by performing bit shift operation using a 16-bit shifter. In the example of FIG. 2, an arithmetic left-shift operation is performed in which the bit shift amount is in the range from 0 to 7. The PSHs 12a are configured to perform bit rotation (circular shift). That is, if LH and HH are shifted out of the 8-bit range when LL and HL are shifted, the LH and HH are shifted to the lower-order side. As shown in FIG. 5, in the two BSHs 12b, a common bit shift amount is applied to every eighth bit.

As described above, the PSH 12a (PE shifter) and the BSH 12b (bit shifter) constitute the 8-bit shifter pair 12, which is independently provided one pair for each 8 bits. In this case, the positions of the PSH 12a and the BSH 12b may be interchangeable. Unlike the example of FIG. 1, the BSH 12 b may be disposed before the PSH 12 a. The positions of the PSH 12 a and the BSH 12 b may be selected based on whether the operation stage is divided into segments for the purpose of pipelining or in the forwarding path.

Then the 16-bit ALU (L) 14a and the 16-bit ALU (H) 14b are coupled with each other to be treated as a 32-bit ALU. The shift data selection circuit 13 is disposed before each ALU, and is configured to load output data from the BSHs 12b and expand the received data to 16 bits. The shift data selection circuits 13 select data pieces from both the higher and lower BSHs 12b. Therefore, the bit arrangement of the output data of the BSHs 12b is organized by the shift data selection circuits 13. The shift data selection circuits 13 also perform selection of "MSB" (most significant bit) in sign extension and "0" in zero extension. In the example of FIG. 2 in which arithmetic left shift is performed, as 16 bits input in the ALU (L) 14 a, in the lower bits, "0" is selected for each data piece equal to or less than the bit shift amount. Then, lower data (LL), and higher data (LH, HL) in the shifter pairs 12 are sequentially selected. Further, in the ALU (H) 14 b, the higher data (HH) of the shifter pair 12 are selected for the data pieces equal to or less than the bit shift amount, and "MSB" is selected for data pieces (indicated by hatching in FIG. 2) higher than these data pieces to facilitate sign extension. This MSB is the MSB of the HH. If the bit shift amount is in the range from 8 to 16, selections are performed so as to shift by a further 8 bits. Although similar operations are performed even in the case where the bit shift amount is greater than 16, if the bit shift amount is greater than 16 bits, there is no need to select "MSB". That is, the shift data selection circuits 13 are caused to shift each bit of the output data of the n shifter pairs according to the bit shift amounts in the bit shifters and select the data.

Next, the second mode is described with reference to FIG. 3, in which PE splitting is performed (i.e., the data width of the registers 11 is 8 bits and the ALU (L) 14a and the ALU (H) 14b are separately operated as 16-bit ALUs without being coupled with each other) and the arrangement order of the PEs 10 is used as a basis.

The higher-order 8 bit data and the lower-order 8 bit data are read respectively from the registers 11 as data sets independent from each other. The higher-order 8 bit data and the lower-order 8 bit data read by the registers 11 are respectively transferred to the higher and lower shifter pairs 12 each including the PSH 12a and BSH 12b. FIG. 3 illustrates data transfer in the case where data transfer positions in the PEs 10 are the same as the data transfer positions in normal PEs. All data pieces in the registers 11 are transferred to the PE 10 one order higher by the PSHs 12a. Then, the BSHs 12b perform bit shift operations on the data pieces. As shown in FIG. 5, in the two BSHs 12b, a common bit shift amount is applied to every eighth bit. In the example of FIG. 5, the shift amount is in the range from 0 to 7. In the example of FIG. 3, because each BSH 12b performs a bit shift operation of less than 8 bits, data pieces after the bit shift operation are arranged in the BSHs 12b as shown in FIG. 3.

In this case the arrangement order of the PEs 10 is used as a basis; because the two sets of 8-bit data are treated independently from each other, the shifter pairs 12 perform data selections and bit shift operations without interfering with each other. However, in the case of performing normal SIMD processing, because processing is performed using a common instruction for the split ALU 14 (the ALU (L) 14a and the ALU (H) 14b), the PSHs 12a and the BSHs 12b use common transfer positions and common bit shift amounts, respectively, as in the case of 16-bit data. In other words, transfers from the same transfer position are performed, and the bit shift operations using the same shift amount are performed.

Then, the shift data selection circuits 13 load necessary data into the ALU 14. In the case where the arrangement order of the PEs 10 is used as a basis, data in the lower shifter pair 12 are selected for the lower ALU (L) 14a, and data in the higher shifter pair 12 are selected for the ALU (H) 14b. In the example of FIG. 3, as in the case of 16-bit data, arithmetic left shift is performed.

In the lower bits in the ALU (L) 14a, "0" is selected for each data piece equal to or less than the bit shift amount. Then data in the lower shifter pair 12 are selected. In this step, the higher data and the lower data arranged in the inverse order by the bit shift operation are replaced with each other (so that LH is located in the higher position and LL is located in the lower position). Finally, "MSB" (MSB of HH) from the higher shifter pair 12 is selected for the higher region indicated by hatching to facilitate sign extension. The higher ALU (H) 14b operates similarly. First, "0" is selected for each data piece equal to or less than the bit shift amount. Then data in the lower shifter pair 12 are selected. In this step, the higher data and the lower data arranged in the inverse order by the bit shift operation are replaced with each other (so that HH is located in the higher position and HL is located in the lower position). Finally, "MSB" (MSB of HH) from the higher shifter pair 12 is selected for the higher region indicated by hatching for sign extension. Similarly, in the case where the shift amount is in the range from 8 to 15, "0" is selected for data pieces equal to or less than the shift amount. Then data in the lower shifter pair 12 are selected. In the case where the shift amount is equal to or greater than 8 bits, there is no need to select "MSB". That is, the shift data selection circuits 13 are caused to select data from the corresponding bit shifters.

Then the 16-bit ALU (L) 14 a and the 16-bit ALU (H) 14 b are operated independently without being coupled to each other.

The operation in which the arrangement order of the PE 10 is used as a basis is described above. In the case of treating two PEs 10 as two different types without being coupled with each other, it is possible to cause the SIMD microprocessor to function as two SIMD microprocessors instead of causing it to function as a single SIMD microprocessor. In other words, although the PSHs 12a and the BSHs 12b use common transfer positions and common bit shift amounts, respectively, in the above description, it is possible to perform processing using individually specified settings (the fourth mode). The basic operation in the case where processing is performed using individually specified settings is the same as in the case of FIG. 3, and the only difference from the case where the arrangement order of the PEs 10 is used as a basis for processing in the coupled section.

For example, the second mode performs the same operation on two lines of an image or different images, while the fourth mode performs different operations on two lines of an image or different images.

Next, the third mode is described with reference to FIG. 4, in which PE splitting is performed (i.e., the data width of the registers 11 is 8 bits and the ALU (L) 14a and the ALU (H) 14b are individually operated as 16-bit ALUs without being coupled with each other) and the arrangement order of the ALU (L) 14a and the ALU (H) 14b in the PE 10 is used as a basis. In this mode, because a single PE 10 processes two continuous 8-bit data pixels, adjacent pixels to are in the same PE 10 or in different data positions in different PEs 10. In this mode, transfer to a desired data position cannot be achieved by simple shifting among PEs 10.

The higher-order 8 bits data and the lower-order 8 bits data are read respectively from the registers 11 as data sets independent from each other. The higher-order 8 bit data and the lower-order 8 bit data read by the registers 11 are respectively transferred to the higher and lower shifter pairs 12 each including the PSH 12a and BSH 12b.

The PSHs 12a determine transfer positions of the respective sets of 8-bit data taking the positions of the destination PEs 10 into consideration. That is, in some cases, the higher data set and the lower data set are transferred to different positions. FIG. 6 shows transfer positions of the higher PSH and the lower PSH for data transfer among PEs 10. The transfer positions −3, −2, −1, 0, 1, 2, and 3 are common to all the modes, while the transfer positions, −1.5, −0.5, 0.5, and 1.5 are unique to this mode in which the arrangement order of the ALUs in the PE 10 are used as a basis. That is, 0.5 PE indicates the adjacent 8-bit pixel, and 1 PE indicates the second adjacent pixel. Accordingly, .+−.1.5 PE indicates the previous and subsequent 3 pixels, and the .+−.2.5 PE indicates the previous and subsequent 5 pixels. Although ±2.5 PE is not among the listed transfer positions, transfer can still be performed.

FIG. 4 illustrates an example of a 0.5 PE transfer. Referring also to FIG. 6, the upper PSH 12a transfers data to PE 10 one order higher, the immediately higher PE, while the lower PSH 12a transfers data to the same PE 10. In this mode, the arrangement order of data pieces in the PEs 10 is not correct. In each PE 10, the higher 8-bit data set and the lower 8-bit data set are arranged in the inverse order (swapped). That is, the PE shifters in each PE 10 perform transfers independently.

Then, the BSHs 12b performs bit shift operations on the higher data and the lower data. The bit shift amounts used in this step are all the same. In the example of FIG. 4, the shift amount is in the range from 0 to 7. The bit shift operations are common regardless of the order of the ALUs 14, so that bit shift operations are performed on data transferred by the PSHs 12a as they are. Because each BSH 12b performs a bit shift operation of less than 8 bits, data pieces after the bit shift operation are arranged in the BSHs 14b as shown in FIG. 4. In this stage, the sets of data are still swapped. The shifter pairs 12 transfer the data sets swapped by the PSHs 12a to the shift data selection circuits 13 without changing the arrangement order of the data sets.

Then, the shift data selection circuits 13 load necessary data into the ALU 14. In this step, the swapped data sets are swapped back. More specifically, the lower ALU (L) 114a selects data from the higher shifter pair 12, and the higher ALU (H) 14b selects data from the lower shifter pair 12.

In the example of FIG. 4, arithmetic left shift is performed. In the lower bits of the ALU (L) 14a, "0" is selected for each data piece equal to or less than the bit shift amount. Then data in the higher shifter pair 12 are selected. Finally, "MSB" (MSB of HH) from the upper shifter pair 12 is selected for the higher region indicated by hatching for sign extension. The higher ALU (H) 14b operates similarly. First, "0" is selected for each data piece equal to or less than the bit shift amount. Then data in the lower shifter pair 12 are selected. Finally, the region indicated by hatching is caused to select "MSB" from the lower shifter pair 12 for sign extension (MSB of LH). In the case where the shift amount is in the range from 8 to 15, similar operations are performed. That is, the shift data selection circuits 13 are caused to shift each bit of the output data of the n shifter pairs according to the transfer positions in the individual PE shifters and select the data.

In this way, in the case where the arrangement of the ALU (L) 14a and the ALU (H) 14b requires a 0.5 PE transfer (half PE transfer), the transfer can be performed by just switching the data sets to be selected by the shift data selection circuits 13 without adding a new circuit. In the case of full transfers among PEs (i.e, a ±1.0 PE transfer), switching selection data sets between shift data selection circuits 13 is not performed. That is, the same operations are performed as in the above-described case where the arrangement order of the PEs 10 is used as a basis for processing.

In the above-described example, the ALU is split into two ALUs (plural ALUs are independently operated). The configuration similar to this configuration is applicable to the case where the number of ALUs in the PE 10 is increased. For example, when four ALUs are provided, four shifter pairs 12 are provided. By switching data sets to be selected by the shift data selection circuits 13 according to the mode, such as the mode using the arrangement order of the PEs 10 as a basis or the mode using the arrangement order in each PE 10 as a basis, similar operations can be performed.

Figure 8:
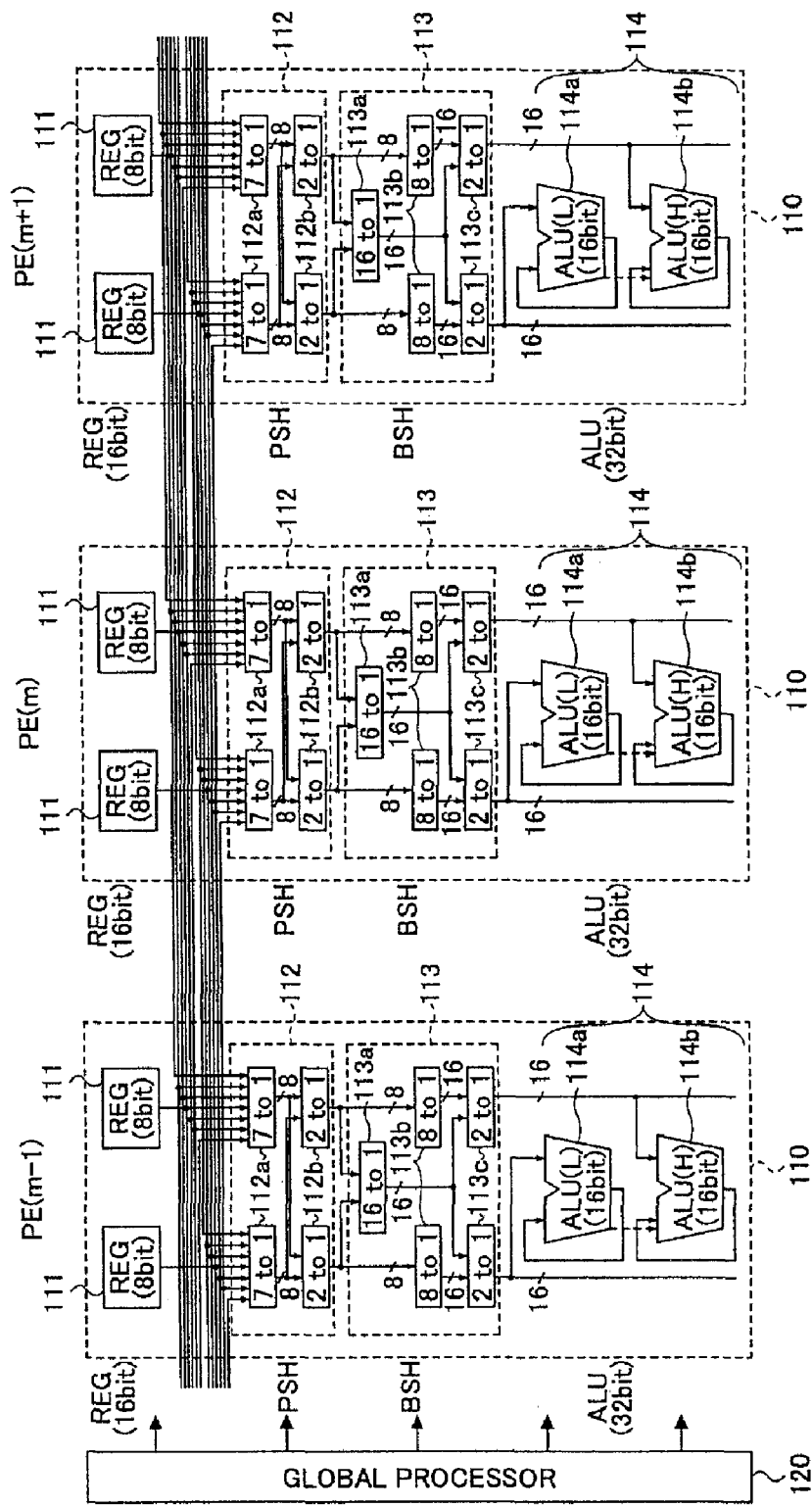
FIG. 8 is a block diagram illustrating a related-art SIMD microprocessor.
Figure 9:
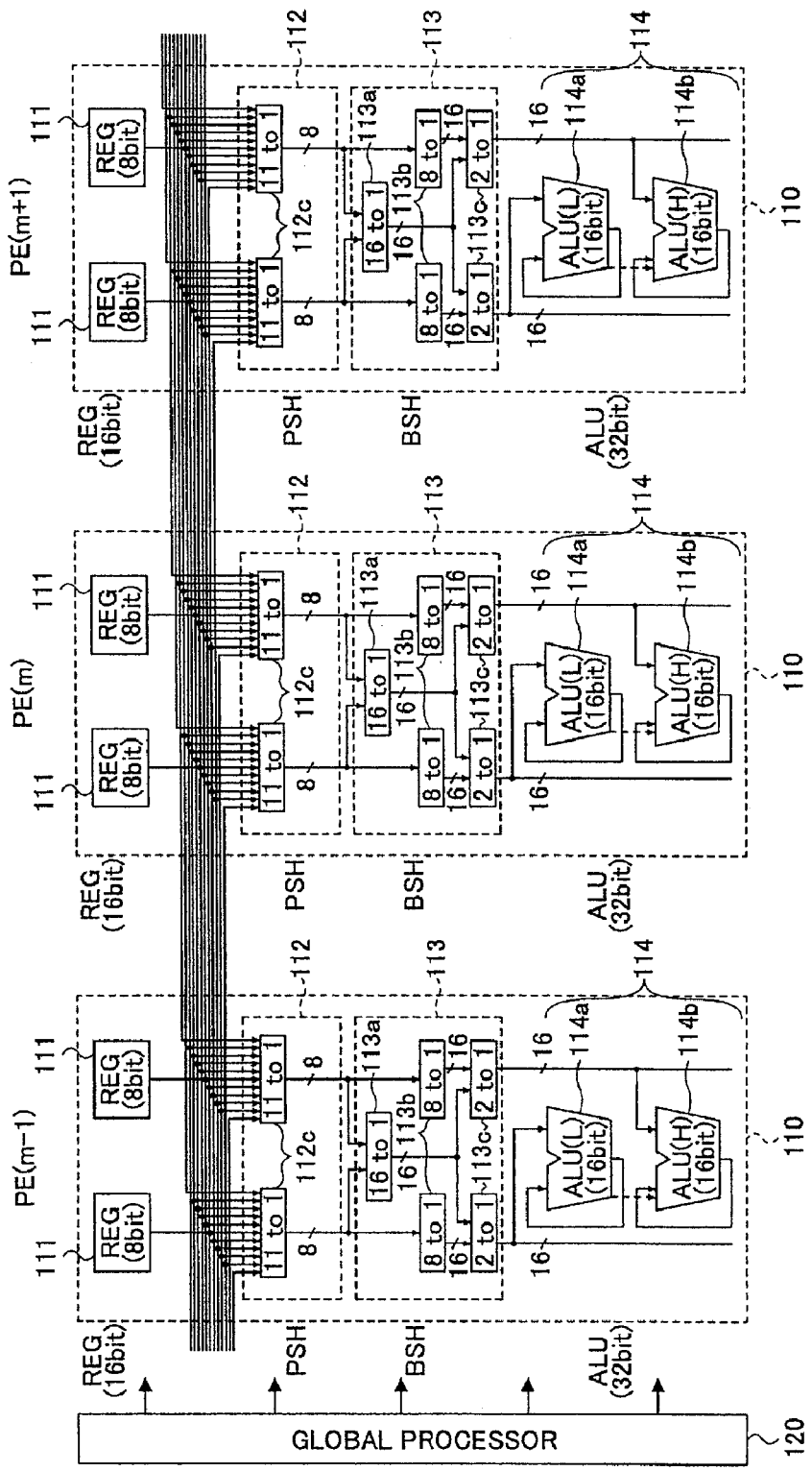
FIG. 9 is a block diagram illustrating another related-art SIMD microprocessor.

The following describes comparisons with the related-art examples shown in FIGS. 8 and 9.

The PSH 12a of this embodiment includes only a 7-to-1 multiplexer. On the other hand, in the related-art example of FIG. 8, a 2-to-1 switch circuit (multiplexer) is provided at the subsequent stage. In the example of FIG. 9, an 11-to-1 multiplexer is used. In the case of treating 16-bit data, although output data pieces of the PSH of this embodiment and the related-art examples are the same, this embodiment allows a simpler circuit configuration and a reduced circuit size.

The BSH 12b of the present embodiment includes only an 8-to-1 multiplexer. On the other hand, the BSH of the related-art examples further includes a 16-to-1 multiplexer and a 2-to-1 multiplexer. The shift data selection circuit 13 is provided at the subsequent stage in the present embodiment, and therefore the operating speed of the present embodiment is substantially the same as that of the related-art examples. However, it is apparent to those skilled in the art that the circuit size of the present embodiment is smaller because no 16-to-1 multiplexer is mounted.

The following describes a comparison with a related-art SIMD processor that does not perform PE splitting and processes normal 16-bit data only, i.e., a SIMD microprocessor with PEs each having a 16-bit register and a 32-bit ALU.

All the PSHs are 7-to-1 multiplexers, so that the circuit size is substantially the same as the circuit size of the present embodiment.

In the circuit of the present embodiment, the BSH includes an 8-to-1 multiplexer. In the related-art example, the BSH includes a 16-to-1 multiplexer and a component corresponding to the shift data selection circuit 13. In the present embodiment, the shift data selection circuit 13 is a 5-to-1 multiplexer for multiplexing "higher data", "lower data", "higher MSB", "lower MSB", and "0". Meanwhile, in the related-art SIMD microprocessor that processes 16-bit data only, the component corresponding to the shift data selection circuit 13 is a 3-to-1 multiplexer for multiplexing "data", "MSB", and "0". That is, the present embodiment has the circuit configuration of 8-to-1+5-to-1 multiplexers, while the related-art SIMD microprocessor that processes 16-bit data has the circuit configuration of 16-to-1+3-to-1 multiplexers. Therefore, the circuit size of the SIMD microprocessor of the present embodiment is the same as or slightly smaller than the circuit size of the related-art SIMD microprocessor.

As described above, the SIMD microprocessor of this embodiment has smaller circuit size and higher operating speed than the related-art splitting type SIMD microprocessors while providing the substantially same performance as non-splitting type SIMD microprocessors.

Figure 7:
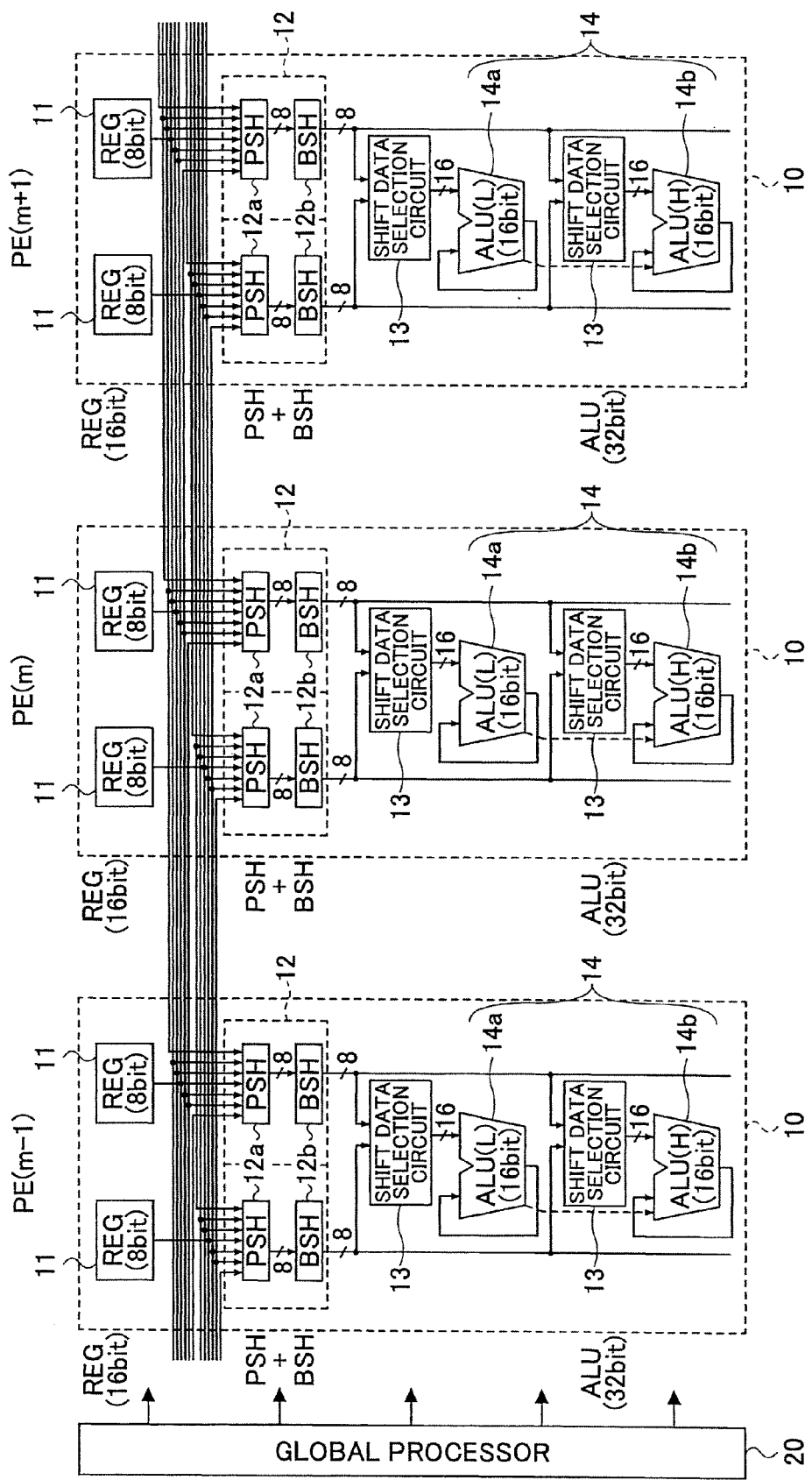
FIG. 7 is a block diagram illustrating a SIMD microprocessor different from the SIMD microprocessor of FIG. 1.

FIG. 7 shows a configuration example different from the configuration example of FIG. 1. In this example, the shift data selection circuit 13 is incorporated in (integral with) the ALU 14. Incorporating the shift data selection circuit 13 in the ALU 14 as shown in FIG. 7 allows reduction of the number of bus interconnects. The reduction of the number of interconnects brings a significant advantage because there is a restriction on the cell size per PE in the circuit of the SIMD microprocessor including many PEs 10.

According to the present embodiment, in the case where the ALU 14 is configured to be operable as two separate ALU (L) 14a and ALU (H) 14b in the PE 10 of the SIMD microprocessor, two shifter pairs 12 each including a PSH 12a and BSH 12b are provided corresponding to the ALU (L) 14a and ALU (H) 14b. Further, the shift data selection circuits 13 are provided that select data output from the shifter pairs 12 and perform bit extension on the selected data. Therefore, it is possible to reduce the circuit size compared to the related-art SIMD microprocessors capable of operating an ALU as two separate ALUs.

Further, since the PE 10 can operate the two ALUs independently from each other or operate the two ALUs as a single ALU, it is possible to process a high quality image with pixels each having a large number of bits. It is also possible to process twice as many pixels by halving the number of bits per pixel.

The present invention is not limited to the above-illustrated embodiment. Variations and modifications may be made without departing from the scope of the invention.

The present application is based on Japanese Priority Application No. 2007-175870 filed on Jul. 4, 2007, with the Japanese Patent Office, the entire contents of which are hereby incorporated herein by reference.

What is claimed is:

1. A SIMD microprocessor comprising:
    plural processor elements each having n arithmetic circuits and n registers configured to temporarily store data pieces to be input to the n arithmetic circuits, n being a natural number equal to or greater than 2, and
    a control circuit configured to determine an arrangement order of the plural processor elements and an arrangement order of the n arithmetic circuits in the plural processor elements and determine whether to use the n arithmetic circuits in each of the plural processor elements as a single arithmetic circuit or as n arithmetic circuits;
    wherein each of the plural processor elements further includes:
    n shifter pairs each including a PE (processor element) shifter in series with and directly connected to a bit shifter, the PE shifter being configured to select and transfer plural data pieces that are input from other plural processor elements, the bit shifter being configured to perform a bit shift operation on the data pieces temporarily stored in the registers; and
    n shift data selection circuits configured to select a subset of data pieces from the data pieces in the bit shifter of the n shifter pairs, perform bit extension on the subset of data pieces, and transfer the subset of data pieces to the n arithmetic circuits.

2. The SIMD microprocessor as claimed in claim 1, wherein the control circuit is configured to operate in a plurality of modes for controlling the n arithmetic circuits in each of the plural processor elements comprising:
    a first mode that controls the n arithmetic circuits in each of the plural processor elements as a single arithmetic circuit;
    a second mode that controls a processing order of the n arithmetic circuits to follow an arrangement order of the plural processor elements when treating the n arithmetic circuits as n arithmetic circuits;
    a third mode that controls the processing order of the n arithmetic circuits to follow an arrangement order of the n arithmetic circuits in each of the plural processor elements when treating the n arithmetic circuits as n arithmetic circuits; and
    a fourth mode that operates the n arithmetic circuits in each of the plural processor elements separately.

3. The SIMD microprocessor as claimed in claim 1, wherein the shift data selection circuits are incorporated in the arithmetic circuits.

4. The SIMD microprocessor as claimed in claim 2, wherein the control circuit is configured to, in the first mode,
    i) cause the PE shifters in each of the n shifter pairs to perform transfers from the same transfer position;
    ii) cause the bit shifters in each of the n shifter pairs to perform bit shift operations using a same bit shift amount; and
    iii) cause the n shift data selection circuits to shift individual bits of output data of the n shifter pairs according to the same bit shift amount in the bit shifters.

5. The SIMD microprocessor as claimed in claim 2, wherein the control circuit is configured to, in the second mode,
    i) cause the PE shifters in each of the n shifter pairs to perform transfers from the same transfer position;
    ii) cause the bit shifters in each of the n shifter pairs to perform bit shift operations using a same bit shift amount; and
    iii) cause the n shift data selection circuits to select data from connected bit shifters.

6. The SIMD microprocessor as claimed in claim 2, wherein the control circuit is configured to, in the third mode,
    i) cause the PE shifters in each of the n shifter pairs to perform transfers independently;
    ii) cause the bit shifters in each of the n shifter pairs to perform bit shift operations using a same bit shift amount shift amount; and
    iii) cause the n shift data selection circuits to shift individual bits of output data of the n shifter pairs according to transfer positions in the individual PE shifters.

7. The SIMD microprocessor as claimed in claim 2, wherein the control circuit is configured to, in the fourth mode, control each of the PE shifters in each of the n shifter pairs, the bit shifters in each of the n shifter pairs, and the n shift data selection circuits separately.

8. A data transfer method for use in a SIMD microprocessor that includes plural processor elements each having n arithmetic circuits, n being a natural number equal to or greater than 2, and is configured to divide input data into n data pieces depending on whether to use the n arithmetic circuits as a single arithmetic circuit or as n arithmetic circuits and transfer the input data to the n arithmetic circuits, the method comprising:
    a step of, for the n data pieces of the input data, selecting and transferring plural of the n data pieces that are input from other processor elements and performing bit shift operations using, in each of the plural processing elements, n shifter pairs each including a PE (processor element) shifter in series with and directly connected to a bit shifter; and a step of selecting a subset of data pieces from the n data pieces on which the data selection and transfer and the bit shift operations are performed via the shifter pairs, performing bit extension on the selected subset of data pieces, and transferring the subset of data pieces to the n arithmetic circuits.

9. The data transfer method for use in a SIMD processor as claimed in claim 8, further comprising:
a step of, according to the input data, selecting one of
a first mode that performs the transfer such that the n arithmetic circuits in each of the plural processor elements are treated as a single arithmetic circuit;
a second mode that performs the transfer in an order that follows an arrangement order of the plural processor elements when treating the n arithmetic circuits as n arithmetic circuits;
a third mode that performs the transfer in an order that follows an arrangement order of the n arithmetic circuits in each of the plural processor elements when treating the n arithmetic circuits as n arithmetic circuits; and
a fourth mode that operates the n arithmetic circuits in each of the plural processor elements separately.

10. The data transfer method for use in a SIMD microprocessor as claimed in claim 9, wherein in the first mode, for each of the n input data pieces, data selection and transfers from the same transfer position are performed; bit shift operations using the same shift amount are performed; and individual bits of output data on which the data selection and transfer and the bit shift operations are performed are shifted according to the same bit shift amount and the data are selected.

11. The data transfer method for use in a SIMD microprocessor as claimed in claim 9, wherein in the second mode, for each of the n input data pieces, data selection and transfer from the same transfer position are performed; bit shift operations using the same shift amount are performed; and output data on which the data selection and transfer and the bit shift operations are performed are selected according to the arithmetic circuits.

12. The data transfer method for use in a SIMD microprocessor as claimed in claim 9, wherein in the third mode, for each of the n input data pieces, data selection and transfer from independent transfer positions are performed; bit shift operations using the same shift amount are performed; and individual bits of output data on which the data selection and transfer and the bit shift operations are performed are shifted according to the independent transfer positions.

13. The data transfer method for use in a SIMD microprocessor as claimed in claim 9, wherein in the fourth mode, for each of the n input data pieces, data selection and transfer are performed from independent transfer positions; bit shift operations using independent shift amounts are performed; and output data on which the data selection and transfer and the bit shift operations are performed are selected according to the arithmetic circuits.

* * * * *